US012534216B1

(12) United States Patent
Durocher et al.

(10) Patent No.: US 12,534,216 B1
(45) Date of Patent: Jan. 27, 2026

(54) CLUTCH ASSEMBLY FOR A HYBRID-ELECTRIC AIRCRAFT PROPULSION SYSTEM

(71) Applicant: Pratt & Whitney Canada Corp., Longueuil (CA)

(72) Inventors: Eric S. Durocher, Boucherville (CA); Michel Labrecque, Ste-Julie (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 19/244,827

(22) Filed: Jun. 20, 2025

(51) Int. Cl.

| | |
|---|---|
| ***B64D 35/022*** | (2025.01) |
| ***B64D 27/33*** | (2024.01) |
| ***F02C 7/36*** | (2006.01) |
| ***F16D 11/14*** | (2006.01) |
| ***F16D 27/01*** | (2006.01) |
| ***F16H 1/22*** | (2006.01) |
| ***F16H 57/02*** | (2012.01) |
| ***F16H 57/021*** | (2012.01) |

(52) U.S. Cl.
CPC ........... *B64D 35/022* (2024.01); *B64D 27/33* (2024.01); *F02C 7/36* (2013.01); *F16D 11/14* (2013.01); *F16D 27/01* (2013.01); *F16H 1/22* (2013.01); *F16H 57/021* (2013.01); *F05D 2230/64* (2013.01); *F05D 2260/4023* (2013.01); *F16H 2057/02034* (2013.01); *F16H 2057/02043* (2013.01)

(58) Field of Classification Search
CPC ............. F16D 11/14; F16H 1/22; F16H 1/227
See application file for complete search history.

(56) References Cited

U.S. PATENT DOCUMENTS

| | | | | |
|---|---|---|---|---|
| 2,068,260 | A | 1/1937 | Biggert, Jr. | |
| 2,830,834 | A | 4/1958 | Wildhaber | |
| 3,656,598 | A | 4/1972 | Goble | |
| 2017/0321601 | A1* | 11/2017 | Lafargue | B64D 27/33 |
| 2020/0298988 | A1* | 9/2020 | LaTulipe | F02B 39/10 |

FOREIGN PATENT DOCUMENTS

| | | | |
|---|---|---|---|
| CA | 3210068 | A1 * | 9/2021 |

OTHER PUBLICATIONS

English Translation. (Year: 2023).*

* cited by examiner

*Primary Examiner* — Brian O Peters
(74) *Attorney, Agent, or Firm* — Getz Balich LLC

(57) ABSTRACT

An aircraft propulsion system includes an engine, an electric machine, and a gearbox. The gearbox includes an output shaft with an axis, an electric machine drive gear mounted on the output shaft and driven by the electric machine, and an engine drive gear couplable with the output shaft by a clutch assembly. The clutch assembly includes a first coupling assembly, a second coupling assembly, and a magnetic alignment system. The first coupling assembly includes a first body mounted on the engine drive gear. The second coupling assembly includes a sliding coupling housing mounted on the output shaft and movable between first and second positions. A second body is mounted on the housing. The second body is disengaged from the first in the first position and engaged in the second. The magnetic alignment system includes magnets on the bodies that couple magnetically in the second position.

20 Claims, 10 Drawing Sheets

CLUTCH ASSEMBLY FOR A HYBRID-ELECTRIC AIRCRAFT PROPULSION SYSTEM

TECHNICAL FIELD

This disclosure relates generally to hybrid-electric propulsion systems for aircraft and, more particularly, to a gearbox clutch assembly for hybrid-electric propulsion systems.

BACKGROUND OF THE ART

Hybrid-electric propulsion systems for aircraft may typically include an electric machine configured to supplement or replace a propulsion system engine (e.g., a gas turbine engine, an intermittent combustion engine, etc.) output to one or more propulsors. Various hybrid-electric propulsion system configurations are known. While these known propulsion system configurations may be suitable for their intended purposes, there is always room in the art for improvement.

SUMMARY

According to an aspect of the present disclosure, an aircraft propulsion system includes an engine, an electric machine, a gearbox, and a propulsor. The gearbox includes an output shaft, an electric machine drive gear, an engine drive gear, and a clutch assembly. The output shaft has a rotational axis. The electric machine drive gear is mounted on the output shaft. The electric machine drive gear is driven by the electric machine. The engine drive gear is selectively couplable with the output shaft by the clutch assembly. The clutch assembly includes a first coupling assembly, a second coupling assembly, and a magnetic alignment system. The first coupling assembly includes a first coupling body. The first coupling body is moveably mounted on the engine drive gear. The second coupling assembly includes a sliding coupling housing and a second coupling body. The sliding coupling housing is moveably mounted on the output shaft. The sliding coupling housing is axially moveable between a first axial position and a second axial position. The second coupling body is moveably mounted on the sliding coupling housing. The second coupling body is disengaged from the first coupling body with the sliding coupling housing in the first axial position. The second coupling body is engaged with the first coupling body with the sliding coupling housing in the second axial position. The magnetic alignment system includes a plurality of first magnet members and a plurality of second magnet members. The plurality of first magnet members are mounted at the first coupling body in a first circumferential arrangement. The plurality of second magnet members are mounted at the second coupling body in a second circumferential arrangement. The plurality of first magnet members are magnetically couplable with the plurality of second magnet members with the sliding coupling housing in the second axial position. The propulsor is driven by the output shaft.

In any of the aspects or embodiments described above and herein, the sliding coupling housing may be coupled with the output shaft at a splined interface between the sliding coupling housing and the output shaft.

In any of the aspects or embodiments described above and herein, the first coupling assembly may include a plurality of first axial springs and the second coupling assembly includes a plurality of second axial springs, the plurality of first axial springs may bias the first coupling body axially outward from the engine drive gear toward the second coupling assembly, and the plurality of second axial springs may bias the second coupling body axially outward from the sliding coupling housing toward the first coupling assembly.

In any of the aspects or embodiments described above and herein, the first coupling assembly may further include a plurality of first circumferential springs and the second coupling assembly further includes a plurality of second circumferential springs, the plurality of first circumferential springs may bias the first coupling body in a first circumferential direction, and the plurality of second circumferential springs may bias the second coupling body in a second circumferential direction, opposite the first circumferential direction.

In any of the aspects or embodiments described above and herein, the clutch assembly may further include an actuator connected to the sliding coupling housing, and the actuator may be configured to effect axial movement of the sliding coupling housing between the first axial position and the second axial position.

In any of the aspects or embodiments described above and herein, the first coupling body may include a first ring body segment and a plurality of first coupling body segments, the plurality of first coupling body segments may be arranged on the first ring body segment as a first circumferential array, and the plurality of first coupling body segments may project axially outward from the first ring body segment toward the second coupling body.

In any of the aspects or embodiments described above and herein, one of the plurality of first magnet members may be disposed on each of the plurality of first coupling body segments.

In any of the aspects or embodiments described above and herein, one of the plurality of first magnet members may be disposed on the ring body segment circumferentially between each circumferentially adjacent pair of the plurality of first coupling body segments.

In any of the aspects or embodiments described above and herein, the gearbox may further include a bearing disposed between the output shaft and the engine drive gear, and the engine drive gear may be rotatable relative to the output shaft on the bearing.

In any of the aspects or embodiments described above and herein, the gearbox may further include a bearing disposed between the electric machine drive gear and the engine drive gear, and the engine drive gear may be rotatable relative to the electric machine drive gear on the bearing.

In any of the aspects or embodiments described above and herein, the engine may include an engine output shaft, the gearbox may include an input shaft and a layshaft assembly, the engine output shaft may be coupled with the input shaft, and the layshaft assembly may couple the input shaft with the engine drive gear.

In any of the aspects or embodiments described above and herein, the engine drive gear may include a first plurality of coupling segments, the sliding coupling housing may include a second plurality of coupling segments, and the first plurality of coupling segments may engage the second plurality of coupling segments with the sliding coupling housing in the second axial position.

According to another aspect of the present disclosure, a method for coupling an engine of an aircraft propulsion system with a propulsor, the propulsor driven by an output shaft, an engine drive gear driven by the engine decoupled from the output shaft by a clutch assembly in a disengaged state, includes driving rotation of the propulsor about a rotational axis with an electric machine coupled with the propulsor by the output shaft and moving a second coupling assembly of the clutch assembly by controlling an actuator to axially move the second coupling assembly from a first axial position to a second axial position. The second coupling assembly in the first axial position is disengaged from a first coupling assembly of the clutch assembly. The second coupling assembly in the second axial position is engaged with the first coupling assembly. The second coupling assembly is moveable on the output shaft between the first axial position and the second axial position. The first coupling assembly includes a first coupling body moveably mounted on the engine drive gear. The second coupling assembly includes a second coupling body. The method further includes magnetically coupling, with the second coupling assembly in the second axial position, a plurality of second magnet members mounted at the second coupling body with a plurality of first magnet members mounted at the first coupling body and driving rotation of the propulsor about the rotational axis with the engine through the engine drive gear, the first coupling assembly, and the second coupling assembly.

In any of the aspects or embodiments described above and herein, coupling the engine with the propulsor may include controlling the engine to drive rotation of the engine drive gear at a rotation speed of the output shaft prior to controlling the actuator to axially move the sliding coupling housing from the first axial position to the second axial position.

In any of the aspects or embodiments described above and herein, coupling the engine with the propulsor may include relighting the engine.

In any of the aspects or embodiments described above and herein, the method may further include deenergizing the electric machine subsequent to coupling the engine with the propulsor.

According to another aspect of the present disclosure, an aircraft propulsion system includes an engine, an electric machine, a gearbox, and a propulsor. The gearbox includes an output shaft, an electric machine drive gear, an engine drive gear, and a clutch assembly. The output shaft has a rotational axis. The electric machine drive gear is mounted on the output shaft. The electric machine drive gear is driven by the electric machine. The engine drive gear is selectively couplable with the output shaft by the clutch assembly. The clutch assembly includes a bearing disposed between the output shaft and the engine drive gear. The engine drive gear is rotatable relative to the output shaft on the bearing. The clutch assembly selectively couples the engine drive gear with the output shaft. The clutch assembly is configurable in a disengaged state and an engaged state. The clutch assembly includes a first coupling assembly, a second coupling assembly, and a magnetic alignment system. The first coupling assembly includes a first coupling body and a plurality of first axial springs. The first coupling body is moveably mounted on the engine drive gear. The plurality of first axial springs biases the first coupling body axially outward from the engine drive gear toward the second coupling assembly. The second coupling assembly includes a sliding coupling housing, a second coupling body, and a plurality of second axial springs. The sliding coupling housing is moveably mounted on the output shaft. The sliding coupling housing is axially moveable between a first axial position and a second axial position. The second coupling body is moveably mounted on the sliding coupling housing. The second coupling body is disengaged from the first coupling body with the sliding coupling housing in the first axial position. The second coupling body is engaged with the first coupling body with the sliding coupling housing in the second axial position. The plurality of second axial springs bias the second coupling body axially outward from the sliding coupling housing toward the first coupling assembly. The magnetic alignment system includes a plurality of first magnet members and a plurality of second magnet members. The plurality of first magnet members are mounted at the first coupling body as a first circumferential arrangement. The plurality of second magnet members are mounted at the second coupling body as a second circumferential arrangement. The propulsor driven by the output shaft.

In any of the aspects or embodiments described above and herein, the first coupling body may include a first ring body segment and a plurality of first coupling body segments, the plurality of first coupling body segments may be arranged on the first ring body segment as a first circumferential array, and the plurality of first coupling body segments project axially outward from the first ring body segment toward the second coupling body.

In any of the aspects or embodiments described above and herein, one of the plurality of first magnet members may be disposed on each of the plurality of first coupling body segments.

In any of the aspects or embodiments described above and herein, one of the plurality of first magnet members may be disposed on the ring body segment circumferentially between each circumferentially adjacent pair of the plurality of first coupling body segments.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
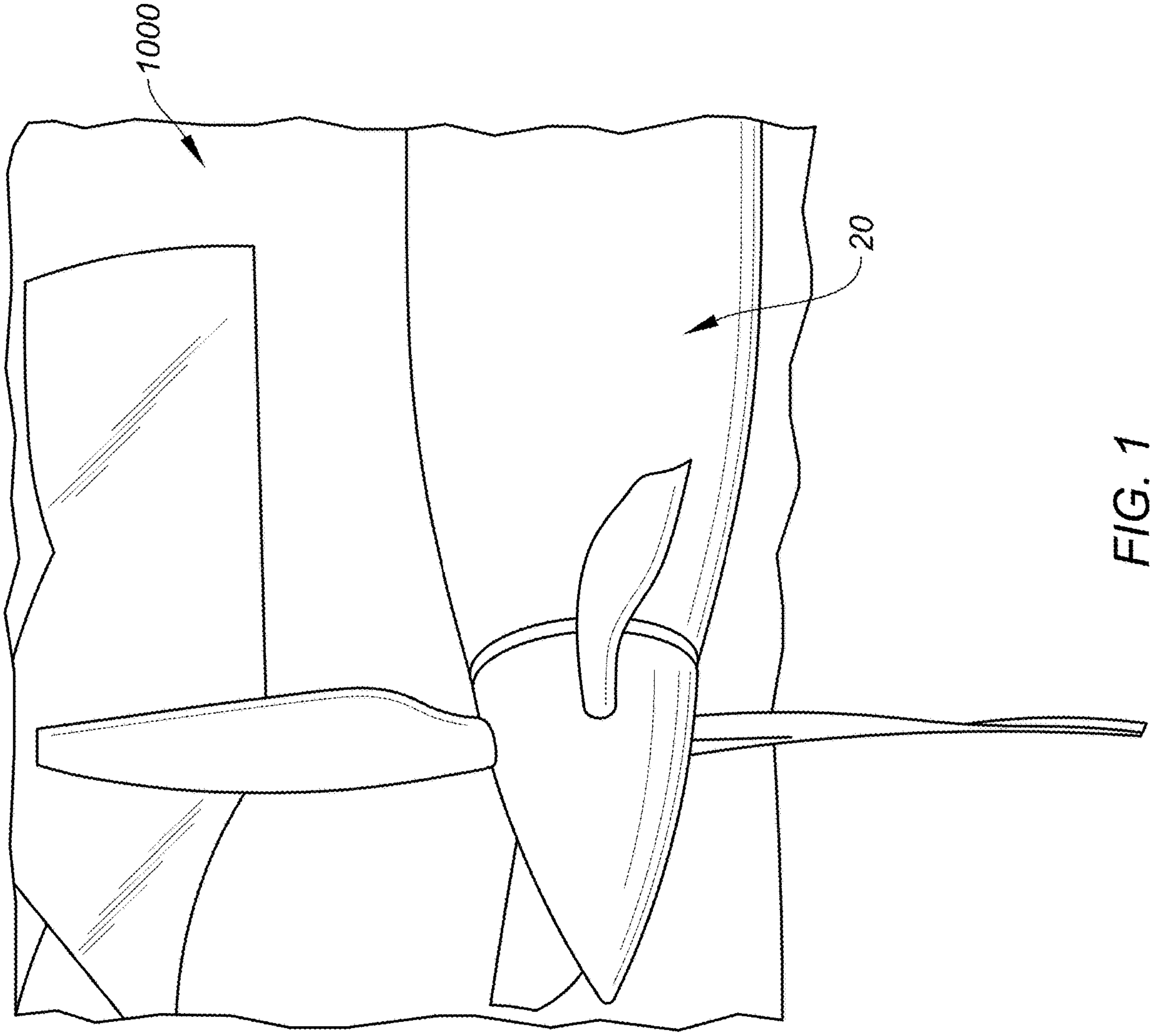
FIG. 1 illustrates an aircraft including a propulsion system, in accordance with one or more embodiments of the present disclosure.

FIG. 1 illustrates an aircraft 1000 including at least one propulsion system 20. Briefly, the aircraft may be a fixed-wing aircraft (e.g., an airplane), a rotary-wing aircraft (e.g., a helicopter), a tilt-rotor aircraft, a tilt-wing aircraft, or another aerial vehicle. Moreover, the aircraft may be a manned aerial vehicle or an unmanned aerial vehicle (UAV, e.g., a drone).

Figure 2:
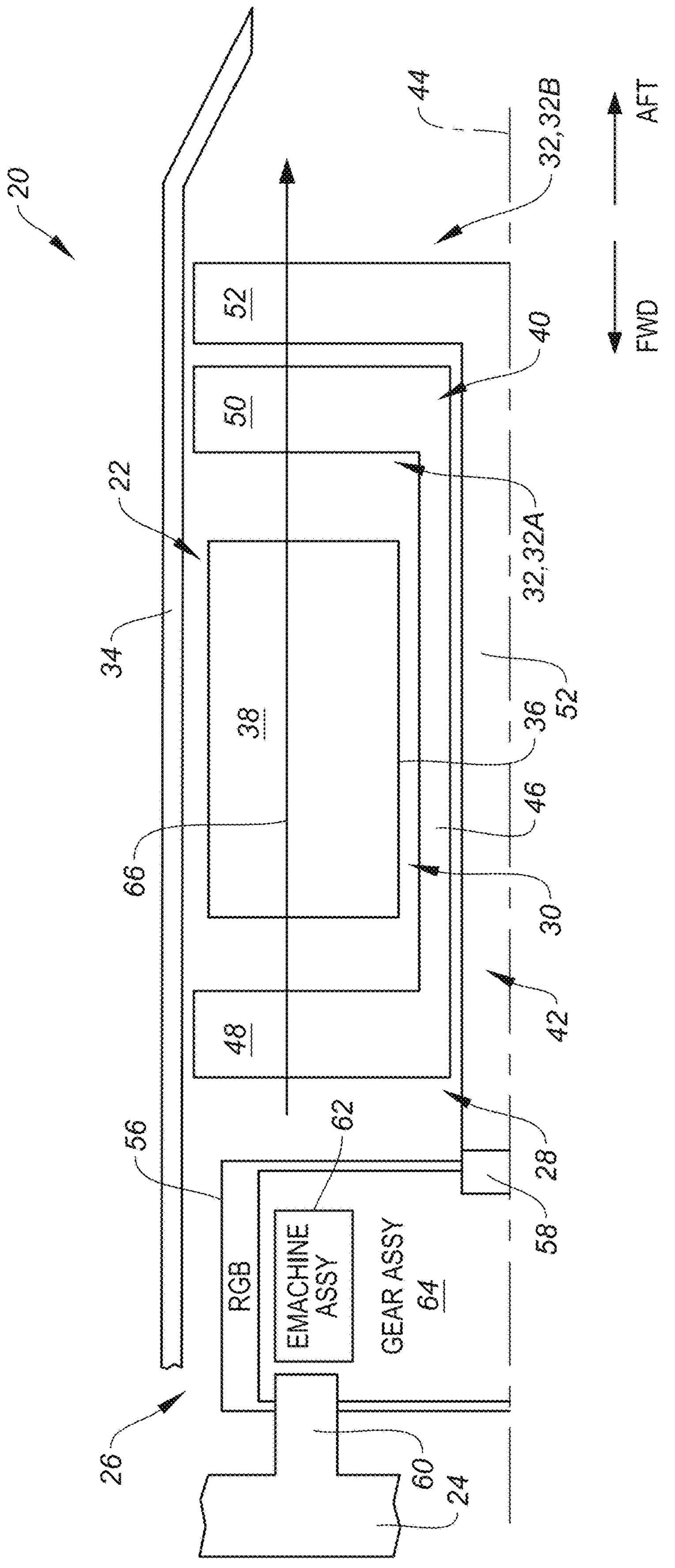
FIG. 2 schematically illustrates a cutaway, side view of an aircraft propulsion system, in accordance with one or more embodiments of the present disclosure.

FIG. 2 schematically illustrates a cutaway, side view of the propulsion system 20. The propulsion system 20 of FIG. 2 includes an engine 22, a propulsor 24, and a drivetrain 26. The engine 22 of FIG. 2 is configured as a turboprop gas turbine engine. However, the present disclosure is not limited to any particular configuration of gas turbine engine for the propulsion system 20, and examples of gas turbine engine configurations for the propulsion system 20 may include, but are not limited to, a turbofan engine, a turbojet engine, a propfan engine, or the like. Aspects of the present disclosure may be equally applicable to aircraft propulsion systems including other engine configurations such as, but not limited to, rotary engines, piston engines, intermittent combustion engines, or any other internal combustion engine.

The engine 22 of FIG. 2 includes a compressor section 28, a combustor section 30, a turbine section 32, and an engine static structure 34. The combustor section 30 includes a combustor 36 (e.g., an annular combustor) forming a combustion chamber 38. The turbine section 32 includes a high-pressure turbine 32A and a power turbine 32B.

Components of the compressor section 28 and/or the turbine section 32 of FIG. 2 form a first rotational assembly 40 (e.g., a high-pressure spool) and a second rotational assembly 42 of the engine 22. The first rotational assembly 40 and the second rotational assembly 42 are mounted for rotation about a rotational axis 44 (e.g., an axial centerline) of the engine 22 relative to the engine static structure 34.

The first rotational assembly 40 includes a first shaft 46, a bladed compressor rotor 48 for the compressor section 28, and a bladed first turbine rotor 50 for the high-pressure turbine 32A. The first shaft 46 interconnects the bladed compressor rotor 48 and the first turbine rotor 50.

The second rotational assembly 42 of FIG. 2 includes a second shaft 52 (e.g., an engine output shaft) and a bladed power turbine rotor 54 for the power turbine 32B. The second shaft 52 is connected to the power turbine rotor 54. The second shaft 52 is coupled with the propulsor 24 by the drivetrain 26.

The drivetrain 26 includes a gearbox 56 (e.g., a reduction gearbox (RGB)). The gearbox 56 may assume different configurations. The term "gearbox" as used herein may refer to a reduction gearbox that is configured to accept an input rotational drive at a first rotational speed (S1) and at a first torque (T1) and produce an output rotational drive at a second rotational speed (S2) and at a second torque (T2), wherein the first rotational speed is greater than the second rotational speed (S1>S2) and the second torque is greater than the first torque (T2>T1). The drivetrain 26 further includes a gearbox input shaft 58, a gearbox output shaft 60 (e.g., a propulsor output shaft or a propeller shaft), and an electric machine assembly 62.

The gearbox 56 includes and houses a gear assembly 64. The gear assembly 64 couples the gearbox input shaft 58 with the gearbox output shaft 60. For example, the gear assembly 64 may be a reduction gear assembly configured to drive rotation of the gearbox output shaft 60 at a reduced rotational speed relative to the gearbox input shaft 58. The gearbox input shaft 58 is coupled with (e.g., mounted on) the second shaft 52, and interconnects the second shaft 52 with the gear assembly 64. The gearbox output shaft 60 is coupled with (e.g., mounted on) the propulsor 24, and interconnects the propulsor 24 with the gear assembly 64. As will be described in further detail, the electric machine assembly 62 includes one or more electric machines coupled with the gearbox output shaft 60.

The engine static structure 34 includes engine casings, cowlings, and other fixed (e.g., non-rotating) structures of the engine 22 which form, house, and/or support components of the engine 22 such as, but not limited to, those of the compressor section 28, the combustor section 30, and the turbine section 32. The engine static structure 34 may include one or more bearing assemblies configured to rotationally support components of the first rotational assembly 40 and the second rotational assembly 42.

During operation of the propulsion system 20 of FIG. 2, ambient air enters the propulsion system 20 (e.g., through an air intake) and is directed through the engine 22 along a core gas flow path 66. The ambient air flow along the core gas flow path 66 is compressed in the compressor section 28 by rotation of the bladed compressor rotor 48, and directed into the combustor 36 (e.g., the combustion chamber 38). Fuel is injected into the combustion chamber 38 and mixed with the compressed air to provide a fuel-air mixture. This fuel-air mixture is ignited, and combustion products thereof flow through the high-pressure turbine 32A and the power turbine 32B and are exhausted from the propulsion system 20. The first turbine rotor 50 and the power turbine rotor 54 rotationally drive the first rotational assembly 40 and the second rotational assembly 42, respectively, in response to the combustion gas flow through the high-pressure turbine 32A and the power turbine 32B along the core gas flow path 66. The second rotational assembly 42 (e.g., the second shaft 52) drives rotation of the propulsor 24 through the drivetrain 26. The engine 22 and the electric machine(s) of the electric machine assembly 62 may be selectively operated to drive rotation of the propulsor 24 through the gearbox output shaft 60 through the gear assembly 64.

Figure 3:
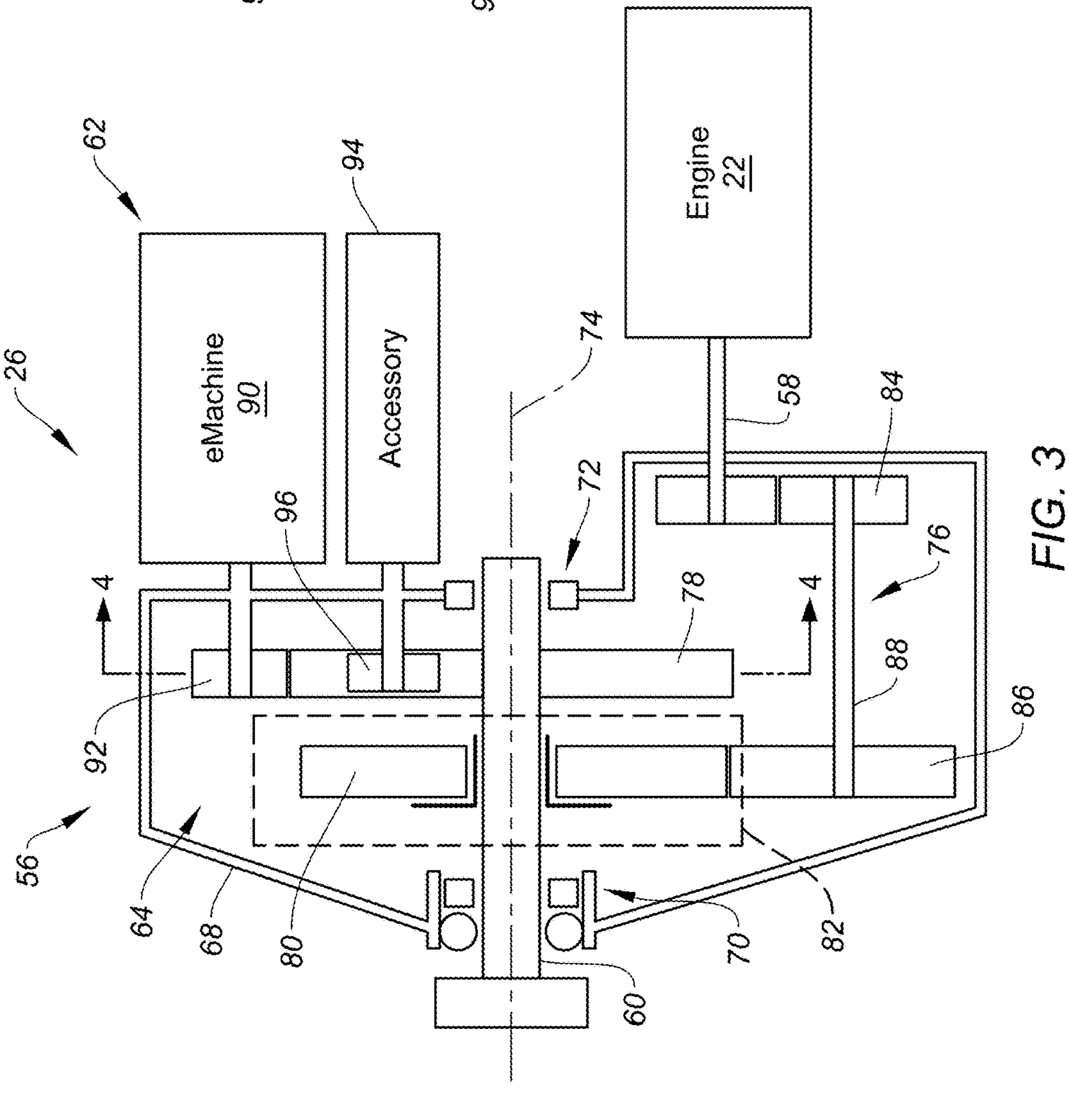
FIG. 3 schematically illustrates a cutaway, side view of a portion of a gearbox, electric machine assembly, and engine of the aircraft propulsion system, in accordance with one or more embodiments of the present disclosure.

FIG. 3 schematically illustrates a cutaway, side view of the gearbox 56 coupled with the engine 22 and the electric machine assembly 62. The gearbox 56 includes a gearbox housing 68, a forward bearing assembly 70, and an aft bearing assembly 72. The gearbox housing 68 houses the gear assembly 64. The gearbox housing 68 structurally supports the forward bearing assembly 70 and the aft bearing assembly 72. The gearbox output shaft 60 is mounted on the forward bearing assembly 70 and the aft bearing assembly 72 for rotation about an output shaft rotational axis 74. The gear assembly 64 of FIG. 3 includes a layshaft assembly 76, an electric machine drive gear 78, an engine drive gear 80, and a clutch assembly 82.

The layshaft assembly 76 includes a layshaft input gear 84, a layshaft output gear 86, and a layshaft 88. The layshaft input gear 84 is engaged (e.g., meshed) with the gearbox input shaft 58. The layshaft output gear 86 is engaged (e.g., meshed) with the engine drive gear 80. The layshaft 88 interconnects the layshaft input gear 84 and the layshaft output gear 86. FIG. 3 illustrates a single layshaft assembly 76 coupling the gearbox input shaft 58 with the engine drive gear 80; however, in some embodiments, the gear assembly 64 may include more than one layshaft assembly 76 (e.g., two layshaft assemblies) coupling the gearbox input shaft 58 with the engine drive gear 80.

The electric machine drive gear 78 is mounted (e.g., fixedly mounted) on the gearbox output shaft 60. The electric machine drive gear 78 extends circumferentially about (e.g., completely around) the gearbox output shaft 60 and the output shaft rotational axis 74. The electric machine drive gear 78 may be disposed axially between the engine drive gear 80 and the aft bearing assembly 72. The electric machine drive gear 78 is coupled with an electric machine 90 (e.g., an electric motor) of the electric machine assembly 62. In particular, the electric machine drive gear 78 is engaged (e.g., meshed) with an electric machine output shaft 92 of the electric machine 90. FIG. 3 illustrates a single electric machine 90 coupled with the electric machine drive gear 78; however, in some embodiments, the electric machine assembly 62 may include more than one electric machine 90 coupled with the electric machine drive gear 78.

The engine drive gear 80 extends circumferentially about (e.g., completely around) the gearbox output shaft 60 and the output shaft rotational axis 74. The engine drive gear 80 may be disposed axially between the electric machine drive gear 78 and the forward bearing assembly 70. The engine drive gear 80 is selectively couplable with the gearbox output shaft 60 by the clutch assembly 82.

Figure 4:
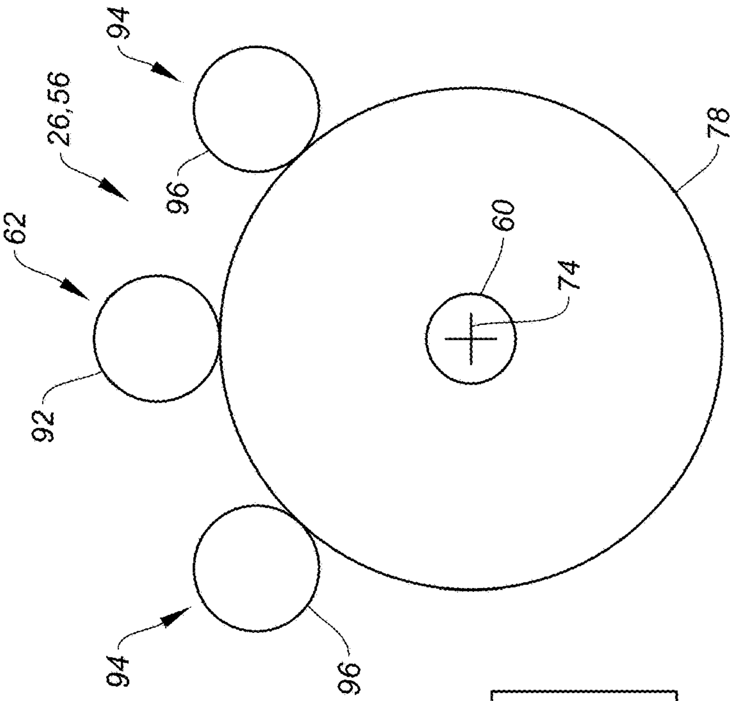
FIG. 4 schematically illustrates a cross-sectional view of the gearbox taken along Line 4-4 of FIG. 3, in accordance with one or more embodiments of the present disclosure.

FIG. 4 schematically illustrates a cross-sectional view of the gear assembly 64 taken along Line 4-4 of FIG. 3. Referring to FIGS. 3 and 4, the gearbox 56 may be coupled to one or more accessory load assemblies 94 of the propulsion system 20 and its engine 22. The gearbox housing 68 may provide support for the accessory load assemblies 94. Each of the accessory load assemblies 94 may be driven by a respective offset gear 96 engaged (e.g., meshed) with the electric machine drive gear 78. Each of the offset gears 96 may be sized (e.g., relative to the electric machine drive gear 78) to facilitate a suitable rotational speed (e.g., speed ratio) for the respective the accessory load assemblies 94. The present disclosure is not limited to any particular number, arrangement, size, or other configuration of the offset gears 96. Examples of the accessory load assemblies 94 may include oil pumps, propeller control units (PCUs), air compressors, electrical generators (e.g., a low-voltage generator), a hydraulic pump, and the like. The configuration of the accessory load assemblies 94 and respective offset gears 96 of FIGS. 3 and 4 facilitate driving the accessory load assemblies 94 with the electric machine(s) 90 during propulsion system 20 operating conditions where the engine 22 may be shutdown. This configuration further facilitates driving the accessory load assemblies 94 with the engine 22 alone or with both the engine 22 and the electric motor(s) 90 during other operating conditions of the propulsion system 20.

Figure 5:
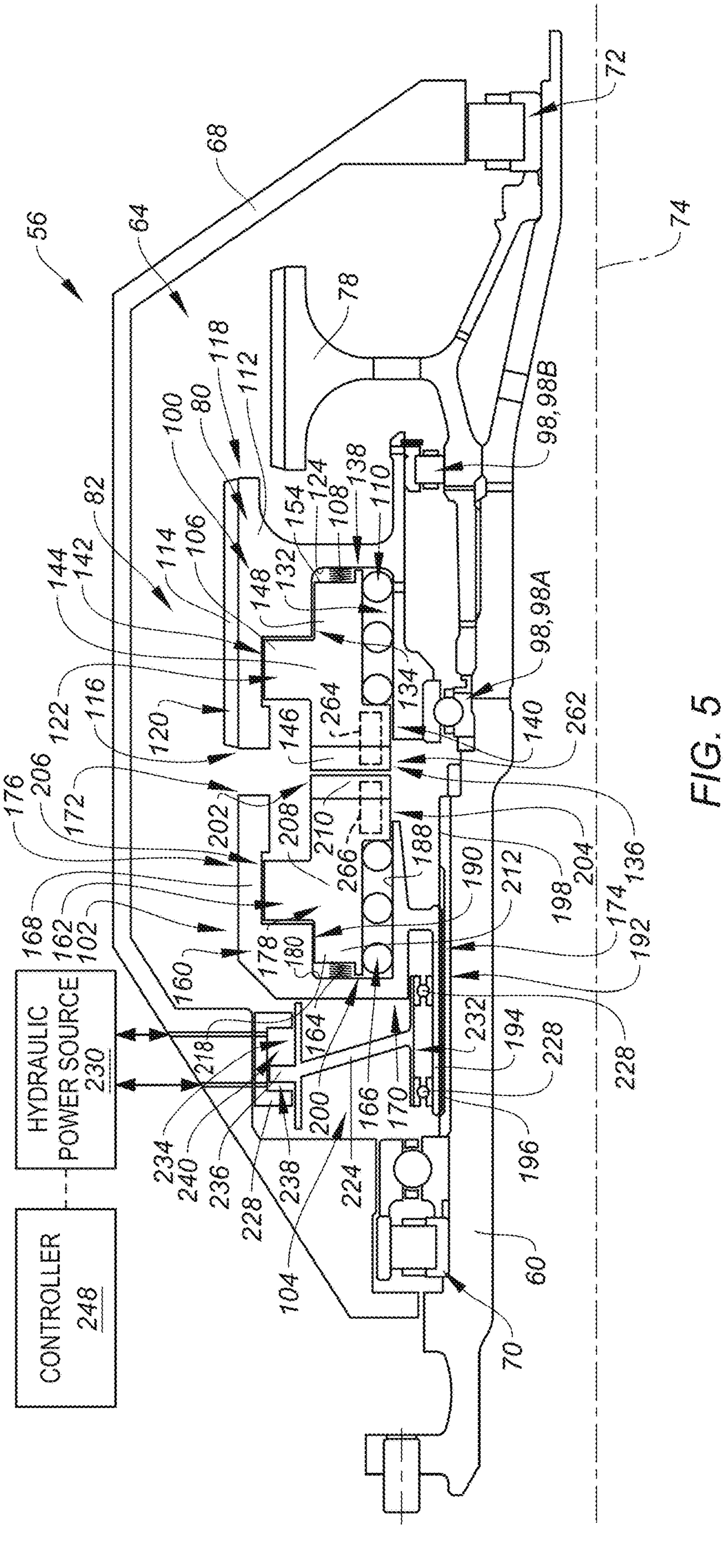
FIG. 5 schematically illustrates a cutaway, side view of the gearbox and a clutch assembly in a disengaged state, in accordance with one or more embodiments of the present disclosure.
Figure 6:
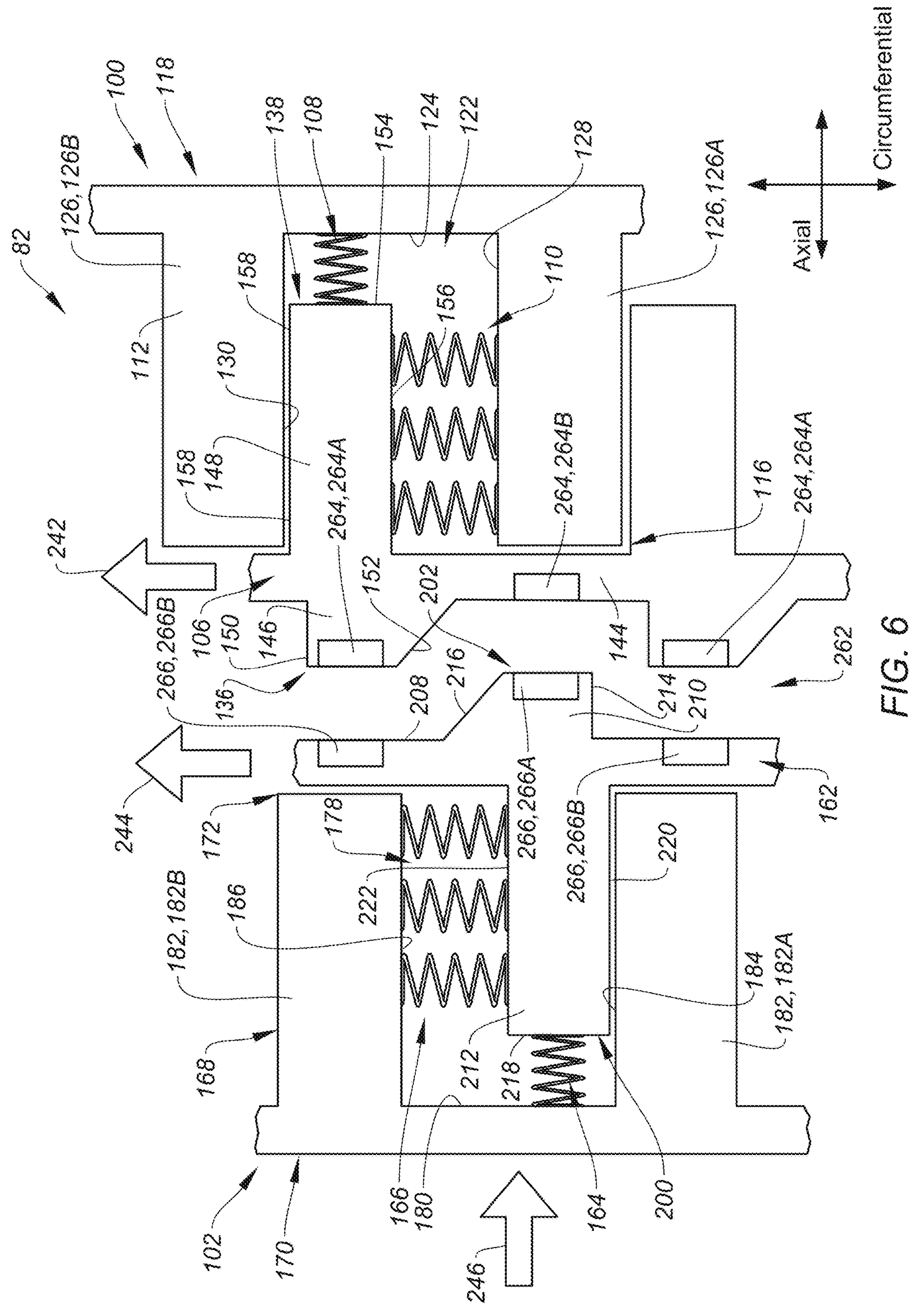
FIG. 6 schematically illustrates a view of a circumferential portion of the clutch assembly of FIG. 5 in the disengaged state, in accordance with one or more embodiments of the present disclosure.
Figure 7:
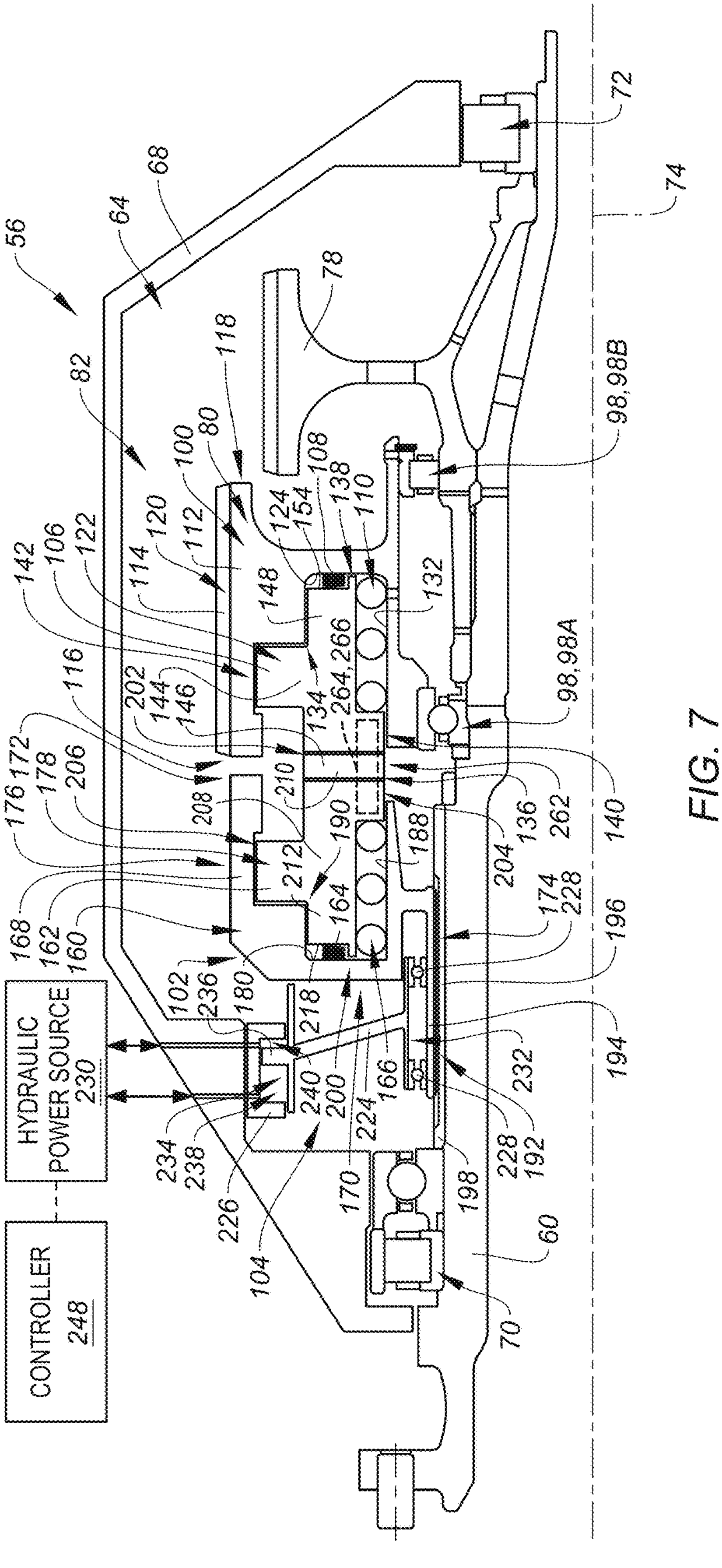
FIG. 7 schematically illustrates a cutaway, side view of the gearbox and the clutch assembly of FIG. 5 in an engaged state, in accordance with one or more embodiments of the present disclosure.

FIGS. 5-8 illustrate the clutch assembly 82 in greater detail. FIGS. 5 and 6 show the clutch assembly 82 in a disengaged state in which the clutch assembly 82 the engine drive gear 80 is rotationally decoupled from the gearbox output shaft 60 by the clutch assembly 82. FIGS. 7 and 8 show the clutch assembly 82 in an engaged state in which the clutch assembly 82 couples the engine drive gear 80 with the gearbox output shaft 60. The clutch assembly 82 includes one or more engine drive gear bearings 98, a first coupling assembly 100, a second coupling assembly 102, and an actuator assembly 104.

The engine drive gear bearings 98 are mounted on the gearbox output shaft 60 and/or the electric machine drive gear 78. For example, the engine drive gear bearings 98 of FIGS. 5 and 6 include a first bearing 98A mounted on the gearbox output shaft 60 and a second bearing 98B mounted on the electric machine drive gear 78. The engine drive gear bearings 98 extend circumferentially about the gearbox output shaft 60 and its output shaft rotational axis 74. The engine drive gear 80 is rotationally mounted on the engine drive gear bearings 98 with the engine drive gear bearings 98 disposed radially between the engine drive gear 80 and the gearbox output shaft 60 and/or the electric machine drive gear 78. The engine drive gear 80 is rotatable on the engine drive gear bearings 98 about the output shaft rotational axis 74 relative to the gearbox output shaft 60 and the electric machine drive gear 78.

The first coupling assembly 100 includes the engine drive gear 80, a coupling body 106 and a plurality of axial springs 108. The first coupling assembly 100 may additionally include a plurality of circumferential springs 110.

The engine drive gear 80 includes a gear body 112 and a plurality of teeth 114. The gear body 112 extends circumferentially about (e.g., completely around) the output shaft rotational axis 74. The gear body 112 extends axially between and to a first axial end 116 of the gear body 112 and a second axial end 118 of the gear body 112. The gear body 112 includes an outer radial end 120 extending between the first axial end 116 and the second axial end 118. The gear body 112 forms a plurality of coupling cavities 122 radially inward of the outer radial end 120. The coupling cavities 122 are arranged on the gear body 112 as a circumferential array. For example, the coupling cavities 122 may be circumferentially equispaced about the output shaft rotational axis 74. Each of the coupling cavities 122 extends axially through the gear body 112 from the first axial end 116 to an axial end wall 124 of the gear body 112. The gear body 112 includes a plurality of body segments 126. Each of the body segments 126 extends axially from the axial end wall 124 to or toward the first axial end 116. Like the coupling cavities 122, the body segments 126 are arranged on the gear body 112 as a circumferential array. Each of the coupling cavities 122 is formed by and circumferentially between a circumferentially adjacent pair of the body segments 126. For example, each of the coupling cavities 122 is formed by and circumferentially between a first circumferential end wall 128 of a first body segment 126A and an opposing second circumferential end wall 130 of a second body segment 126B. Each of the coupling cavities 122 is further formed by and radially between an inner radial end wall 132 of the gear body 112 and an outer radial end wall 134 of the gear body 112. The teeth 114 are disposed on the gear body 112 at the outer radial end 120. The teeth 114 are engaged (e.g., meshed) with the layshaft assembly 76 (e.g., the layshaft output gear 86).

The coupling body 106 is moveably mounted on the gear body 112. The coupling body 106 extends circumferentially about the output shaft rotational axis 74. The coupling body 106 extends axially between and to a first axial end 136 of the coupling body 106 and a second axial end 138 of the coupling body 106. The coupling body 106 extends radially between and to an inner radial end 140 of the coupling body

106 and an outer radial end 142 of the coupling body 106. The coupling body 106 includes a ring body segment 144, a plurality of coupling body segments 146, and a plurality of biasing body segments 148. The ring body segment 144 extends circumferentially about (e.g., completely around) the output shaft rotational axis 74.

The coupling body segments 146 are arranged on the ring body segment 144 as a circumferential array. For example, the coupling body segments 146 may be circumferentially equispaced about the output shaft rotational axis 74. Each of the coupling body segments 146 projects axially outward from the ring body segment 144 to the first axial end 136. The coupling body segments 146 are disposed, at least in part, axially outside of the gear body 112. Each of the coupling body segments 146 extends circumferentially between and to a first coupling surface 150 of the respective coupling body segment 146 and a second coupling surface 152 of the respective coupling body segment 146. The first coupling surface 150 may be understood as torque transfer surface of the coupling body 106. The first coupling surface 150 may extend substantially axially from the ring body segment 144 to the first axial end 136. The second coupling surface 152 has an oblique orientation characterized by axial and circumferential elements. For example, as the second coupling surface 152 extends axially from the ring body segment 144 to the first axial end 136, the second coupling surface 152 extends circumferentially toward the first coupling surface 150.

The biasing body segments 148 are arranged on the ring body segment 144 as a circumferential array. For example, the biasing body segments 148 may be circumferentially equispaced about the output shaft rotational axis 74. Each of the biasing body segments 148 projects axially outward from the ring body segment 144 to the second axial end 138. Each of the biasing body segments 148 includes an axial end wall 154 at the second axial end 138. The biasing body segments 148 are disposed, at least in part, axially within the gear body 112. In particular, each of the biasing body segments 148 is disposed within a respective one of the coupling cavities 122. Each of the biasing body segments 148 extends circumferentially between and to a first circumferential end wall 156 of the respective biasing body segment 148 and a second circumferential end wall 158 of the respective biasing body segment 148. The biasing body segments 148 have a circumferential span which is less than a circumferential span of the respective coupling cavities 122, such that the biasing body segments 148 are circumferentially moveable within the respective coupling cavities 122.

The axial springs 108 and the circumferential springs 110 are disposed within the coupling cavities 122 and contacting the coupling body 106 and the gear body 112. At least one of the axial springs 108 is disposed within each of the coupling cavities 122 extending between (e.g., axially between) and contacting the gear body 112 and the respective one of the biasing body segments 148. In particular, the axial springs 108 are connected to and compressed between the axial end wall 124 and the axial end wall 154. The axial springs 108 bias the coupling body 106 axially outward from the gear body 112 in an axial direction toward the second coupling assembly 102. At least one of the circumferential springs 110 is disposed within each of the coupling cavities 122 extending between (e.g., circumferentially between) and contacting the gear body 112 and the respective one of the biasing body segments 148. In particular, the circumferential springs 110 are connected to and compressed between the first circumferential end wall 128 and the first circumferential end wall 156. The circumferential springs 110 bias the coupling body 106 in a first circumferential direction toward the second circumferential end wall 130. The coupling body segments 146 are arranged extending circumferentially from the second coupling surface 152 to the first coupling surface 150 in the first circumferential direction. The circumferential springs 110 of FIGS. 5-8 are arranged with three circumferential springs 110 contacting (e.g., biasing) each of the biasing body segments 148; however, the present disclosure is not limited to any particular quantity of the circumferential springs 110 for each of the biasing body segments 148.

The second coupling assembly 102 includes a sliding coupling housing 160, a coupling body 162 and a plurality of axial springs 164. The second coupling assembly 102 may additionally include a plurality of circumferential springs 166.

The sliding coupling housing 160 includes a housing body 168. The housing body 168 extends circumferentially about (e.g., completely around) the output shaft rotational axis 74. The housing body 168 extends axially between and to a first axial end 170 of the housing body 168 and a second axial end 172 of the housing body 168. The second axial end 172 is disposed axially adjacent and spaced from the first axial end 116. The housing body 168 extends radially between and to inner radial end 174 of the housing body 168 and an outer radial end 176 of the housing body 168. The housing body 168 forms a plurality of coupling cavities 178. The coupling cavities 178 are arranged on the housing body 168 as a circumferential array. For example, the coupling cavities 178 may be circumferentially equispaced about the output shaft rotational axis 74. Each of the coupling cavities 178 extends axially through the housing body 168 from the second axial end 172 to an axial end wall 180 of the housing body 168. The housing body 168 includes a plurality of body segments 182. Each of the body segments 182 extends axially from the axial end wall 180 to or toward the second axial end 172. Like the coupling cavities 178, the body segments 182 are arranged on the housing body 168 as a circumferential array. Each of the coupling cavities 178 is formed by and circumferentially between a circumferentially adjacent pair of the body segments 182. For example, each of the coupling cavities 178 is formed by and circumferentially between a first circumferential end wall 184 of a first body segment 182A and an opposing second circumferential end wall 186 of a second body segment 182B. Each of the coupling cavities 178 is further formed by and radially between an inner radial end wall 188 of the housing body 168 and an outer radial end wall 190 of the gear body 112.

The sliding coupling housing 160 is moveably couplable with the gearbox output shaft 60. For example, the sliding coupling housing 160 of FIGS. 5 and 7 is moveably couplable with the gearbox output shaft 60 at a splined interface 192. The sliding coupling housing 160 of FIGS. 5 and 7 includes a plurality of axial splines 194 at the inner radial end 174. The gearbox output shaft 60 includes a plurality of axial splines 196. For example, the gearbox output shaft 60 of FIGS. 5 and 7 includes a sleeve 198 extending circumferentially about the output shaft rotational axis 74 and forming the axial splines 196. The axial splines 194 and the axial splines 196 are each arranged as a circumferentially array extending circumferentially about the output shaft rotational axis 74. The axial splines 194 are engaged (e.g., meshed) with the axial splines 196 forming the splined interface 192. The sliding coupling housing 160 is axially moveable (e.g., translatable) on and relative to the gearbox output shaft 60 and the engine drive gear 80. The sliding coupling housing 160 is axially moveable between a first axial position (see FIGS. 5 and 6; e.g., a forward axial position) and a second axial position (see FIGS. 7 and 8; e.g., an aft axial position). The sliding coupling housing 160 is described above as being configured for coupling with the gearbox output shaft 60 by the axial splines 194, 196 at the splined interface 192. However, the present disclosure is not limited to this foregoing exemplary coupling configuration of the sliding coupling housing 160. The sliding coupling housing 160 may alternatively be couplable with the gearbox output shaft 60 using any suitable mechanical coupling interface (e.g., a lug and slot coupling arrangement, a keyed sliding coupling arrangement, an Oldham coupling arrangement, etc.) configured to facilitate axial motion of the sliding coupling housing 160 and torque and rotation transfer from the engine drive gear 80 to the gearbox output shaft 60 through the sliding coupling housing 160.

The coupling body 162 is moveably mounted on the housing body 168. The coupling body 162 extends circumferentially about the output shaft rotational axis 74. The coupling body 162 extends axially between and to a first axial end 200 of the coupling body 162 and a second axial end 202 of the coupling body 162. The coupling body 162 extends radially between and to an inner radial end 204 of the coupling body 162 and an outer radial end 206 of the coupling body 162. The coupling body 162 includes a ring body segment 208, a plurality of coupling body segments 210, and a plurality of biasing body segments 212. The ring body segment 208 extends circumferentially about (e.g., completely around) the output shaft rotational axis 74.

The coupling body segments 210 are arranged on the ring body segment 208 as a circumferential array. For example, the coupling body segments 210 may be circumferentially equispaced about the output shaft rotational axis 74. Each of the coupling body segments 210 projects axially outward from the ring body segment 208 to the second axial end 202. The coupling body segments 210 are disposed, at least in part, axially outside of the housing body 168. Each of the coupling body segments 210 extends circumferentially between and to a first coupling surface 214 of the respective coupling body segment 210 and a second coupling surface 216 of the respective coupling body segment 210. The first coupling surface 214 may be understood as torque transfer surface of the coupling body 162. The first coupling surface 214 may extend substantially axially from the ring body segment 208 to the second axial end 202. The first coupling surface 214 is oriented to face the first coupling surface 150 of each of the coupling body segments 146 such that the first coupling surface 214 may contact the first coupling surface 150 of the respective coupling body segments 146. The second coupling surface 216 has an oblique orientation characterized by axial and circumferential elements. For example, as the second coupling surface 216 extends axially from the ring body segment 208 to the second axial end 202, the second coupling surface 216 extends circumferentially toward the first coupling surface 214. The second coupling surface 216 is oriented to face the second coupling surface 152 of each of the coupling body segments 146 such that the second coupling surface 216 may contact the second coupling surface 152 of the respective coupling body segments 146.

The biasing body segments 212 are arranged on the ring body segment 208 as a circumferential array. For example, the biasing body segments 212 may be circumferentially equispaced about the output shaft rotational axis 74. Each of the biasing body segments 212 projects axially outward from the ring body segment 208 to the first axial end 200. Each of the biasing body segments 212 includes an axial end wall 218 at the first axial end 200. The biasing body segments 212 are disposed, at least in part, axially within the gear body 112. In particular, each of the biasing body segments 212 is disposed within a respective one of the coupling cavities 178. Each of the biasing body segments 212 extends circumferentially between and to a first circumferential end wall 220 of the respective biasing body segment 212 and a second circumferential end wall 222 of the respective biasing body segment 212. The biasing body segments 212 have a circumferential span which is less than a circumferential span of the respective coupling cavities 178, such that the biasing body segments 212 are circumferentially moveable within the respective coupling cavities 178.

The axial springs 164 and the circumferential springs 166 are disposed within the coupling cavities 178 and contacting the coupling body 162 and the housing body 168. At least one of the axial springs 164 is disposed within each of the coupling cavities 178 extending between (e.g., axially between) and contacting the housing body 168 and the respective one of the biasing body segments 212. In particular, the axial springs 164 are connected to and compressed between the axial end wall 180 and the axial end wall 218. The axial springs 164 bias the coupling body 162 axially outward from the housing body 168 in an axial direction toward the first coupling assembly 100. At least one of the circumferential springs 166 is disposed within each of the coupling cavities 178 extending between (e.g., circumferentially between) and contacting the housing body 168 and the respective one of the biasing body segments 212. In particular, the circumferential springs 166 are connected to and compressed between the second circumferential end wall 186 and the second circumferential end wall 222. The circumferential springs 166 bias the coupling body 162 in a first circumferential direction toward the first circumferential end wall 184. The coupling body segments 210 are arranged extending circumferentially from the second coupling surface 216 to the first coupling surface 214 in the second circumferential direction. The circumferential springs 166 of FIGS. 5-8 are arranged with three circumferential springs 166 contacting (e.g., biasing) each of the biasing body segments 212; however, the present disclosure is not limited to any particular quantity of the circumferential springs 166 for each of the biasing body segments 212.

As previously discussed, the sliding coupling housing 160 is axially moveable, with the coupling body 162, the axial springs 164, and the circumferential springs 166, between a first axial position (see FIGS. 5 and 6; e.g., a forward axial position) and a second axial position (see FIGS. 7 and 8; e.g., an aft axial position). In the first axial position, the coupling body 162 (e.g., the coupling body segments 210) is axially separated (e.g., disengaged) from the coupling body 106 (e.g., the coupling body segments 146). In this disengaged axial position of the coupling body 162, the clutch assembly 82 is configured in its disengaged state. In the second axial position, the coupling body 162 (e.g., the coupling body segments 210) are axially coincident (e.g., overlapping) with the coupling body 106 (e.g., the coupling body segments 146) such that the coupling body segments 210 may engage the coupling body segments 146. In this engaged axial position of the coupling body 162, the clutch assembly 82 is configured in its engaged state. The second coupling assembly 102 and the splined interface 192 facilitate axial movement of the second coupling assembly 102 relative to the first coupling assembly 100 while also facilitating selective rotation and torque transfer from the engine drive gear 80 to the gearbox output shaft 60 through the first coupling assembly 100 and the second coupling assembly 102 with the clutch assembly 82 in its engaged state.

The actuator assembly 104 includes a piston 224, a hydraulic chamber housing 226, one or more bearings 228, and a hydraulic power source 230. The piston 224 extends circumferentially about (e.g., completely around) the gearbox output shaft 60 and its output shaft rotational axis 74. The piston 224 extends radially between and to an inner radial end 232 of the piston 224 and an outer radial end 234 of the piston 224. The piston 224 includes a piston seal member 236 disposed at the outer radial end 234. The piston seal member 236 is disposed within the hydraulic chamber housing 226. The piston seal member 236 is disposed between and separates a first hydraulic chamber 238 and a second hydraulic chamber 240. The hydraulic chamber housing 226 of FIGS. 5 and 7 is mounted on the gearbox housing 68. The hydraulic chamber housing 226 further forms the first hydraulic chamber 238 and the second hydraulic chamber 240. The bearings 228 coupling the piston 224 and the sliding coupling housing 160. For example, the bearings 228 are coupled with and radially between the housing body 168 and the inner radial end 232. The sliding coupling housing 160, coupled with the piston 224 by the bearings 228, is axially fixed relative to the piston 224 and rotatable about the output shaft rotational axis 74 relative to the piston 224. The hydraulic power source 230 is connected in fluid communication with the first hydraulic chamber 238 and the second hydraulic chamber 240. The hydraulic power source 230 is configured to selectively direct a pressurized hydraulic fluid to the first hydraulic chamber 238 or the second hydraulic chamber 240 to effect axial movement of the piston 224 and, in turn, the second coupling assembly 102. While the actuator assembly 104 of FIGS. 5 and 7 is configured as a hydraulic linear actuator, the actuator assembly 104 may alternatively be configured as a pneumatic actuator, an electro-mechanical actuator, or another suitable actuator for effecting axial movement of the second coupling assembly 102.

The clutch assembly 82 further includes a magnetic alignment system 262. The magnetic alignment system 262 includes a plurality of first magnet members 264 and a plurality of second magnet members 266. The magnet members 264, 266 may be configured as permanent magnets. Permanent magnets may be formed from ferrite, Alnico, bonded composites, or rare-earth materials such as neodymium-iron-boron (NdFeB) or samarium-cobalt (SmCo), each offering different tradeoffs in strength, temperature tolerance, and corrosion resistance. They may be manufactured in various shapes-including blocks, discs, and arcs-using processes such as sintering, bonding, or molding, and magnetized in axial, radial, or multipole configurations. The present disclosure, however, is not limited to any particular configuration of the magnet members 264, 266.

The first magnet members 264 are mounted on or within the coupling body 106 of the first coupling assembly 100. The first magnet members 264 are arranged on the coupling body 106 as a circumferential array. The first magnet members 264 include a first subset 264A and/or a second subset 264B. Each of the first magnet members 264 of the first subset 264A is disposed at a respective one of the coupling body segments 146. For example, each of the first magnet members 264 of the first subset 264A may be disposed on the respective one of the coupling body segments 146 at the first axial end 136 and circumferentially between the first coupling surface 150 and the second coupling surface 152. Each of the first magnet members 264 of the second subset 264B is disposed at the ring body segment 144. For example, each of the first magnet members 264 of the second subset 264B may be disposed at the ring body segment 144 circumferentially between a respective circumferentially adjacent pair of the coupling body segments 146.

The second magnet members 266 are mounted on or within the coupling body 162 of the second coupling assembly 102. The second magnet members 266 are arranged on the coupling body 106 as a circumferential array. The second magnet members 266 include a first subset 266A and/or a second subset 266B. Each of the second magnet members 266 of the first subset 266A is disposed at a respective one of the coupling body segments 210. For example, each of the second magnet members 266 of the first subset 266A may be disposed on the respective one of the coupling body segments 210 at the second axial end 202 and circumferentially between the first coupling surface 214 and the second coupling surface 216. Each of the second magnet members 266 of the second subset 266B is disposed at the ring body segment 208. For example, each of the second magnet members 266 of the second subset 266B may be disposed at the ring body segment 208 circumferentially between a respective circumferentially adjacent pair of the coupling body segments 210.

During some flight modes, it may be desirable to drive rotation of the propulsor 24 with only the electric machine assembly 62 (e.g., the electric machine(s) 90). The electric machine(s) 90 may drive rotation of the gearbox output shaft 60 through the electric machine drive gear 78 while the clutch assembly 82, in its disengaged state with the second coupling assembly 102 in its disengaged axial position, rotationally decouples the engine 22 from the gearbox output shaft 60. In these electric-only flight modes, the engine 22 may be shut down, idled, or otherwise operated mechanically independent of the gearbox output shaft 60 with the engine output shaft 60 rotating (e.g., freely) relative to the engine drive gear 80 as facilitated by the engine drive gear bearings 98.

During some other flight modes, it may be desirable to drive rotation of the propulsor 24 with only the engine 22 or with a combination of the engine 22 and the electric machine assembly 62. The engine 22 may drive rotation of the gearbox output shaft 60 through the engine drive gear 80 and the clutch assembly 82 once the clutch assembly 82 is configured in its engaged state. The engine 22 may initially be in a shut down or idle operating condition. A pilot or other operator of the aircraft 1000 (see FIG. 1) may relight (e.g., initiate fuel flow and combustion in the engine 22) and/or control the engine 22 to increase a rotation speed of the gearbox input shaft 58 driven by the engine 22 (e.g., the second rotational assembly 42). As shown in FIG. 6, the first coupling assembly 100 (rotating with the engine drive gear 80) and the second coupling assembly 102 (rotating with the gearbox output shaft 60) rotate in respective rotational directions 242, 244. In this initially disengaged state of the clutch assembly 82, the gearbox output shaft 60 and the second coupling assembly 102 may have a greater rotation speed than the engine drive gear 80 and the first coupling assembly 102. The actuator assembly 104 effects axial movement of the second coupling assembly 102 in an axial direction 246 (e.g., an aftward axial direction) toward the engaged axial position of the second coupling assembly 102. The oblique orientation of the second coupling surfaces 152, 216 may allow the coupling bodies 106, 162 to slip past one another if the second coupling assembly 102 is rotating faster than the first coupling assembly 100. The axial springs 108, 164 absorb the axial impact of the coupling body 106 and the coupling body 162, respectively, as the coupling bodies 106, 162 slip past one another.

Figure 8A:
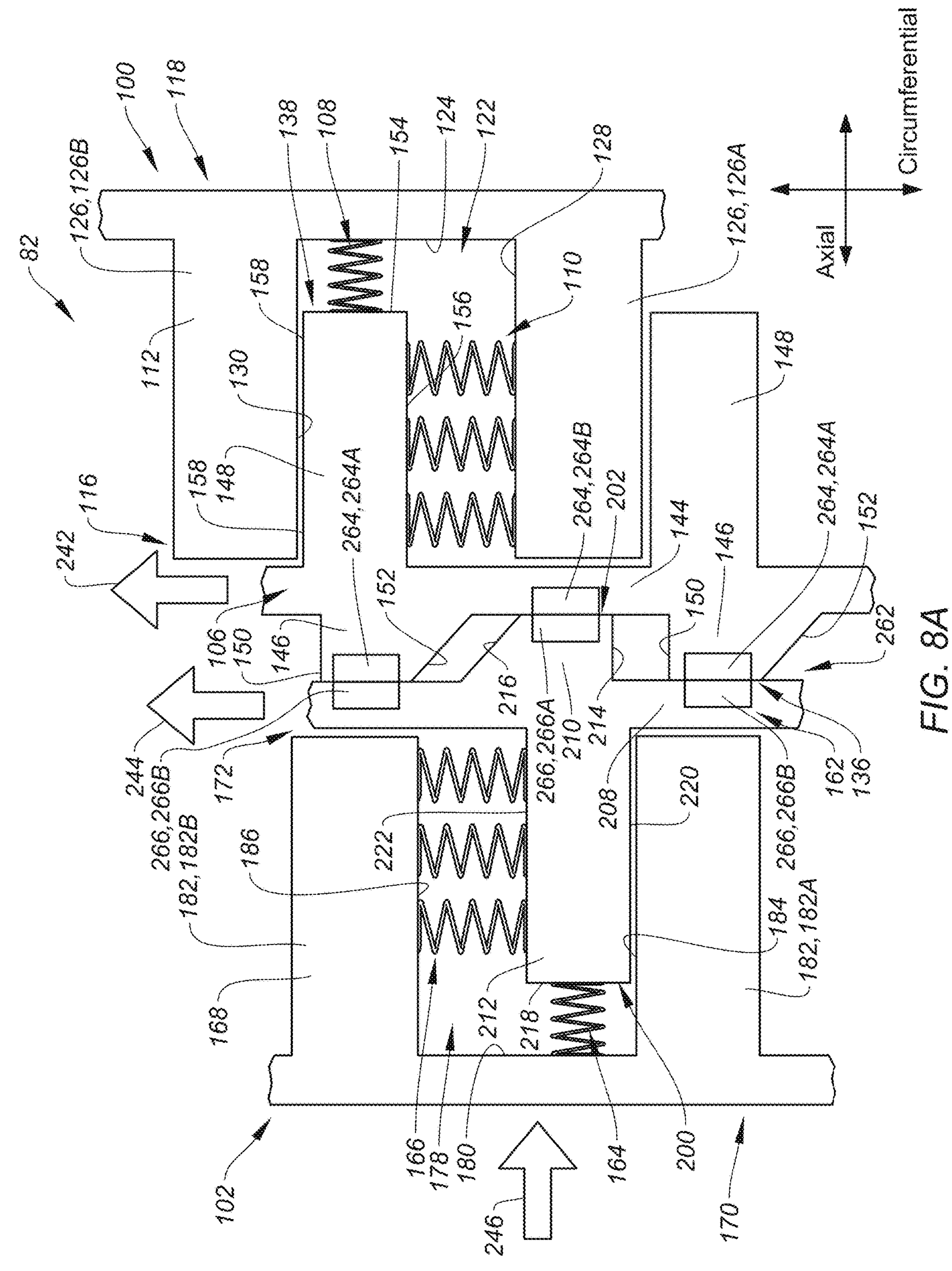
FIGS. 8A and 8B schematically illustrate views of a circumferential portion of the clutch assembly of FIG. 7 in different engagement states, in accordance with one or more embodiments of the present disclosure.
Figure 8B:
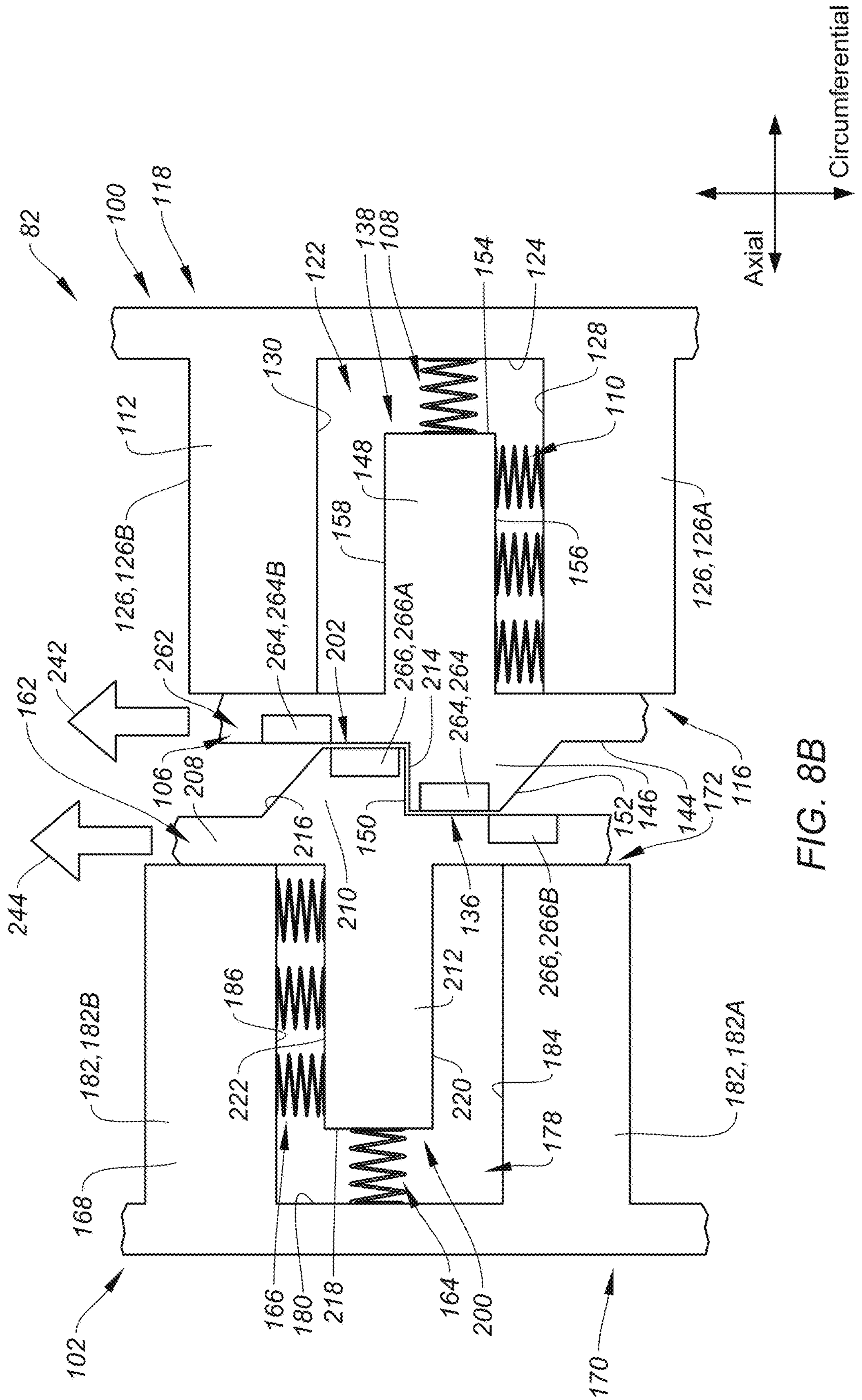

Referring to FIGS. 8A and 8B, the rotation speed of the engine drive gear 80 and the first coupling assembly 100 is increased relative to the gearbox output shaft 60 and the second coupling assembly 102 (e.g., by increasing engine 22 output shaft speed and/or by reducing electric machine(s) 90 speed) as the actuator assembly 104 continues to effect axial movement of the second coupling assembly 102 in the axial direction 246 (e.g., an aftward axial direction) toward the engaged axial position of the second coupling assembly 102. FIG. 8A schematically illustrates an initial state of the first coupling assembly 100 and the second coupling assembly 102 wherein the second coupling assembly 102 is in its engaged axial position. In this initial state of FIG. 8A, the first magnet members 264 are magnetically coupled with the second magnet members 266 to facilitate an angular timing position of the coupling body 106 relative to the coupling body 162 so as to prevent or minimize clashing between the coupling body segments 146, 210 and/or other impacts or stress which would otherwise cause premature wear and reduced reliability of the clutch assembly 82. In particular, as shown in FIG. 8A, the first magnet members 264 of the first subset 264A are magnetically coupled with the second magnet members 266 of the second subset 266B and the first magnet members 264 of the second subset 264B are magnetically coupled with the second magnet members 266 of the first subset 266A. This arrangement of the magnet members 264, 266 facilitates circumferential spacing between the coupling body segments 146 and the coupling body segments 210 as the coupling body segments 146, 210 are positioned in axial alignment with one another.

Referring to FIG. 8B, as a rotation speed of the first coupling assembly 100 increases relative to the second coupling assembly 102, the first coupling surface 150 of the coupling body segments 146 engage the respective first coupling surface 214 of the coupling body segments, driving the gearbox output shaft 60 with the engine drive gear 80 through the first coupling assembly 100 and the second coupling assembly 102. The circumferential springs 110, 166 absorb the circumferential impact between the coupling body 106 and the coupling body 162, respectively, while the rotation speeds of the first coupling assembly 100 and the second coupling assembly 102 are mismatched. Once the engine 22 is coupled with the gearbox output shaft 60, some or all of the electric machine(s) 90 may optionally be deenergized.

In some embodiments the present disclosure clutch assembly 82 may include a controller 248 or be implemented using a controller 248 (e.g., a "shared controller") dedicated to perform other functionality as well as the functionality described herein. A non-limiting example of a "shared controller" is the electronic engine control (EEC). Regardless of whether a dedicated controller or a "shared controller" is utilized, the controller 248 is in communication with other clutch assembly 82 components such as the hydraulic power source 230 to control the operation of the respective clutch assembly 82 components and/or to receive signals from and/or transmit signals to those clutch assembly 82 components to perform the functions described herein. The controller 248 (e.g., the EEC) may be further operable to control the engine 22 and the electric machine assembly 62 to control the relative rotation speeds of the coupling assemblies 100, 102 to facilitate configuring the clutch assembly 82 in its engaged state or disengaged state. The controller 248 may include one or more of any type of computing device, computational circuit, processor(s), CPU, computer, or the like (collectively referred to as a "control device") capable of executing a series of instructions that are stored in memory. In those embodiments wherein the controller 248 includes more than one control device, the control devices may be in communication with one another and may be disposed in any architecture that is capable of achieving the functionality described herein. The instructions may include an operating system, and/or executable software modules such as program files, system data, buffers, drivers, utilities, and the like. The executable instructions may apply to any functionality described herein to enable the clutch assembly 82 to accomplish the same algorithmically and/or coordination of clutch assembly 82 components. The controller 248 includes or is in communication with one or more memory devices. The present disclosure is not limited to any particular type of memory device, and the memory device may store instructions and/or data in a non-transitory manner. Examples of memory devices that may be used include read-only memory, random access memory, volatile memory, non-volatile memory, static memory, dynamic memory, flash memory, cache memory, and/or any device that stores digital information. The controller 248 may include, or may be in communication with, an input device (not shown) that enables a user to enter data and/or instructions, and may include, or be in communication with, an output device configured, for example to display information (e.g., a visual display, or the like), or to transfer data, etc. Communications between the controller 248 and other system components may be via a hardwire connection or via a wireless connection.

Figure 9:
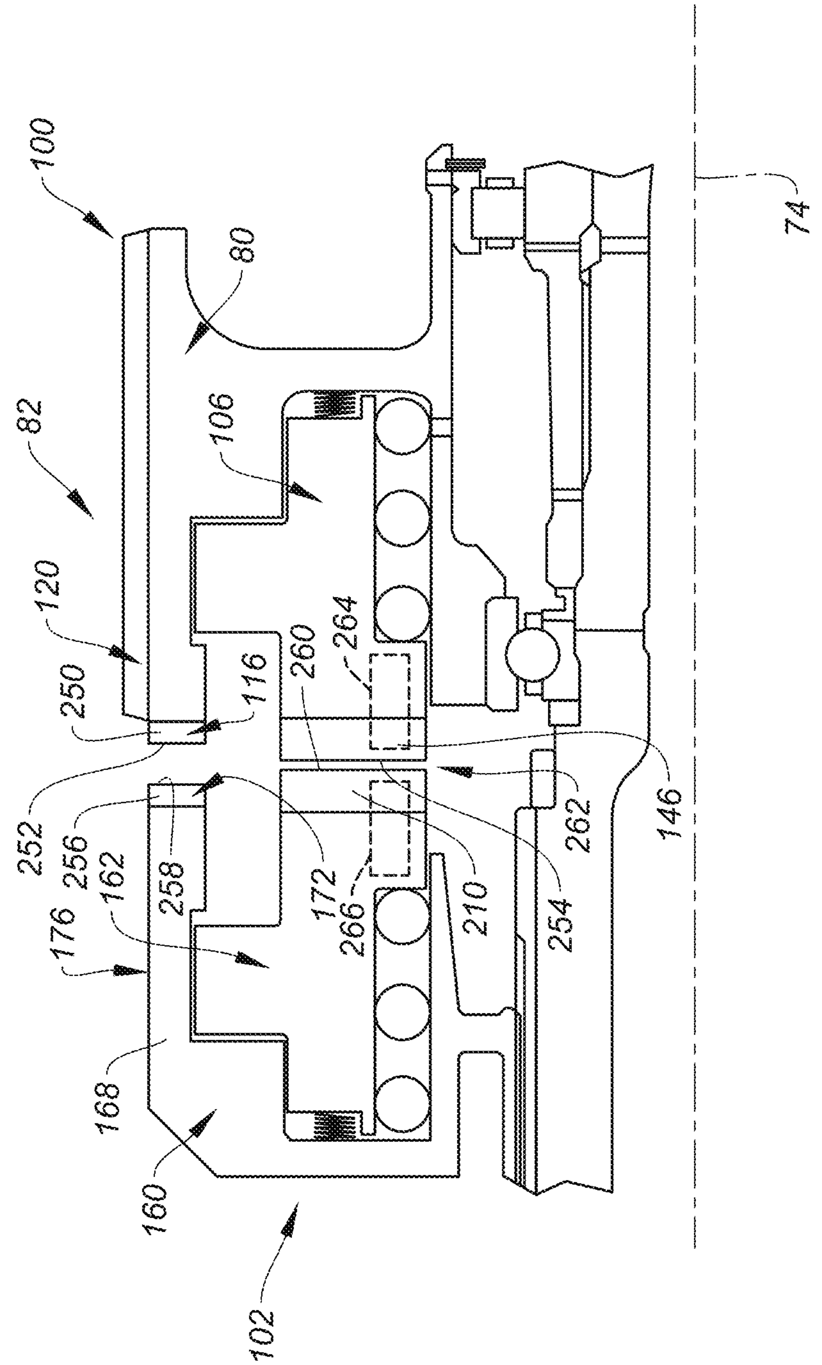
FIG. 9 schematically illustrates a cutaway, side view of the gearbox and another clutch assembly in a disengaged state, in accordance with one or more embodiments of the present disclosure.
Figure 10:
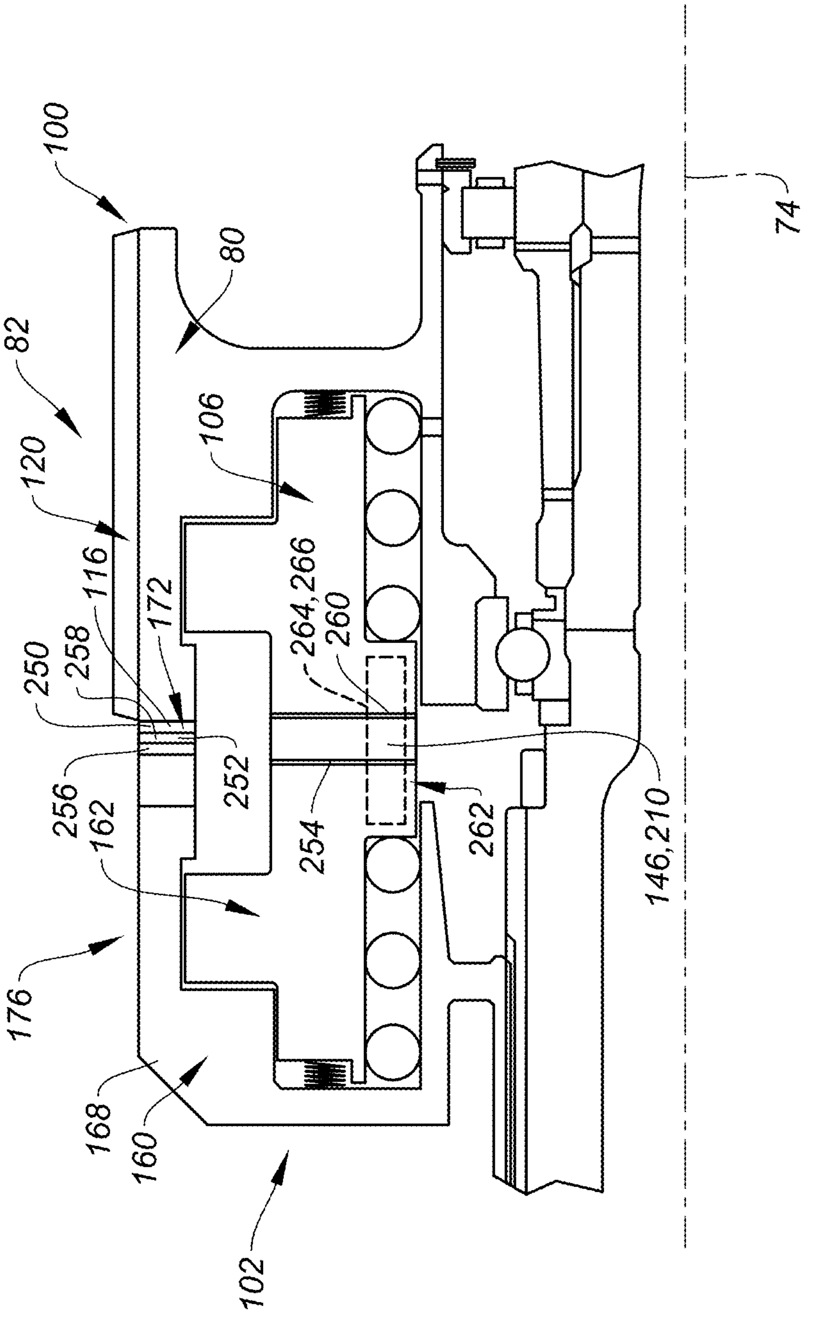
FIG. 10 schematically illustrates a cutaway, side view of the gearbox and the clutch assembly of FIG. 9 in an engaged state, in accordance with one or more embodiments of the present disclosure.

Referring to FIGS. 9 and 10, in some embodiments, the engine drive gear 80 and the sliding coupling housing 160 may be configured to engage one another with the clutch assembly 82 in its engaged state. FIG. 9 illustrates a cutaway, side view of a portion of the clutch assembly 82 in its disengaged state. FIG. 10 illustrates a cutaway, side view of a portion of the clutch assembly 82 in its engaged state.

The engine drive gear 80 of FIGS. 9 and 10 includes a plurality of coupling segments 250. The coupling segments 250 are arranged on the gear body 112 as a circumferential array. For example, the coupling segments 250 may be circumferentially equispaced about the output shaft rotational axis 74. The coupling segments 250 may be disposed at the first axial end 116 and the outer radial end 120 as shown, for example, in FIGS. 9 and 10. Each of the coupling segments 250 projects axially outward from the first axial end 116, toward the second coupling assembly 102, to a distal axial end 252. The distal axial end 252 may be disposed axially between the first axial end 116 and distal axial ends 254 of the coupling body segments 146.

The sliding coupling housing 160 of FIGS. 9 and 10 includes a plurality of coupling segments 256. The coupling segments 256 are arranged on the housing body 168 as a circumferential array. For example, the coupling segments 256 may be circumferentially equispaced about the output shaft rotational axis 74. The coupling segments 256 may be disposed at the second axial end 172 and the outer radial end 176 as shown, for example, in FIGS. 9 and 10. Each of the coupling segments 256 projects axially outward from the second axial end 172, toward the first coupling assembly 100, to a distal axial end 258. The distal axial end 258 may be disposed axially between the second axial end 172 and distal axial ends 260 of the coupling body segments 210.

In the engaged state of the clutch assembly 82, the coupling segments 250 engage (e.g., mesh) with the coupling segments 256 to facilitate more secure rotational coupling of the first coupling assembly 100 with the second coupling assembly 102. The coupling bodies 106, 162, being disposed axially closer to one another than the coupling segments 250, 256, facilitate engagement and rotation speed matching between the first coupling assembly 100 and the second coupling assembly 102 prior to engagement between the coupling segments 250, 256, thereby preventing or reducing the severity of clash between the coupling segments 250, 256.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

The terms "substantially," "about," "approximately," and other similar terms of approximation used throughout this patent application are intended to encompass variations or ranges that are reasonable and customary in the relevant field. These terms should be construed as allowing for variations that do not alter the basic essence or functionality of the invention. Such variations may include, but are not limited to, variations due to manufacturing tolerances, materials used, or inherent characteristics of the elements described in the claims, and should be understood as falling within the scope of the claims unless explicitly stated otherwise.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. An aircraft propulsion system comprising:

an engine;

an electric machine;

a gearbox including an output shaft, an electric machine drive gear, an engine drive gear, and a clutch assembly, the output shaft having a rotational axis, the electric machine drive gear mounted on the output shaft, the electric machine drive gear driven by the electric machine, the engine drive gear selectively couplable with the output shaft by the clutch assembly, the clutch assembly including a first coupling assembly, a second coupling assembly, and a magnetic alignment system, the first coupling assembly including a first coupling body, the first coupling body moveably mounted on the engine drive gear, the second coupling assembly including a sliding coupling housing and a second coupling body, the sliding coupling housing moveably mounted on the output shaft, the sliding coupling housing axially moveable between a first axial position and a second axial position, the second coupling body moveably mounted on the sliding coupling housing, the second coupling body disengaged from the first coupling body with the sliding coupling housing in the first axial position, the second coupling body engaged with the first coupling body with the sliding coupling housing in the second axial position, and the magnetic alignment system including a plurality of first magnet members and a plurality of second magnet members, the plurality of first magnet members mounted at the first coupling body in a first circumferential arrangement, the plurality of second magnet members mounted at the second coupling body in a second circumferential arrangement, the plurality of first magnet members magnetically couplable with the plurality of second magnet members with the sliding coupling housing in the second axial position; and a propulsor driven by the output shaft.

2. The aircraft propulsion system of claim 1, wherein the sliding coupling housing is coupled with the output shaft at a splined interface between the sliding coupling housing and the output shaft.

3. The aircraft propulsion system of claim 1, wherein the first coupling assembly includes a plurality of first axial springs and the second coupling assembly includes a plurality of second axial springs, the plurality of first axial springs bias the first coupling body axially outward from the engine drive gear toward the second coupling assembly, and the plurality of second axial springs bias the second coupling body axially outward from the sliding coupling housing toward the first coupling assembly.

4. The aircraft propulsion system of claim 1, wherein the first coupling assembly further includes a plurality of first circumferential springs and the second coupling assembly further includes a plurality of second circumferential springs, the plurality of first circumferential springs bias the first coupling body in a first circumferential direction, and the plurality of second circumferential springs bias the second coupling body in a second circumferential direction, opposite the first circumferential direction.

5. The aircraft propulsion system of claim 1, wherein the clutch assembly further includes an actuator connected to the sliding coupling housing, the actuator configured to effect axial movement of the sliding coupling housing between the first axial position and the second axial position.

6. The aircraft propulsion system of claim 1, wherein the first coupling body includes a first ring body segment and a plurality of first coupling body segments, the plurality of first coupling body segments are arranged on the first ring body segment as a first circumferential array, and the plurality of first coupling body segments project axially outward from the first ring body segment toward the second coupling body.

7. The aircraft propulsion system of claim 6, wherein one of the plurality of first magnet members is disposed on each of the plurality of first coupling body segments.

8. The aircraft propulsion system of claim 6, wherein one of the plurality of first magnet members is disposed on the ring body segment circumferentially between each circumferentially adjacent pair of the plurality of first coupling body segments.

9. The aircraft propulsion system of claim 1, wherein the gearbox further includes a bearing disposed between the output shaft and the engine drive gear, and the engine drive gear is rotatable relative to the output shaft on the bearing.

10. The aircraft propulsion system of claim 1, wherein the gearbox further includes a bearing disposed between the electric machine drive gear and the engine drive gear, and the engine drive gear is rotatable relative to the electric machine drive gear on the bearing.

11. The aircraft propulsion system of claim 1, wherein the engine includes an engine output shaft, the gearbox includes an input shaft and a layshaft assembly, the engine output shaft is coupled with the input shaft, and the layshaft assembly couples the input shaft with the engine drive gear.

12. The aircraft propulsion system of claim 1, wherein the engine drive gear includes a first plurality of coupling segments, the sliding coupling housing includes a second plurality of coupling segments, and the first plurality of coupling segments engage the second plurality of coupling segments with the sliding coupling housing in the second axial position.

13. A method for coupling an engine of an aircraft propulsion system with a propulsor, the propulsor driven by an output shaft, an engine drive gear driven by the engine decoupled from the output shaft by a clutch assembly in a disengaged state, the method comprising:

driving rotation of the propulsor about a rotational axis with an electric machine coupled with the propulsor by the output shaft;

moving a second coupling assembly of the clutch assembly by controlling an actuator to axially move the second coupling assembly from a first axial position to a second axial position, the second coupling assembly in the first axial position disengaged from a first coupling assembly of the clutch assembly, the second coupling assembly in the second axial position engaged with the first coupling assembly, the second coupling assembly moveable on the output shaft between the first axial position and the second axial position, the first coupling assembly including a first coupling body moveably mounted on the engine drive gear, the second coupling assembly including a second coupling body;

magnetically coupling, with the second coupling assembly in the second axial position, a plurality of second magnet members mounted at the second coupling body with a plurality of first magnet members mounted at the first coupling body; and driving rotation of the propulsor about the rotational axis with the engine through the engine drive gear, the first coupling assembly, and the second coupling assembly.

14. The method of claim 13, wherein coupling the engine with the propulsor includes controlling the engine to drive rotation of the engine drive gear at a rotation speed of the output shaft prior to controlling the actuator to axially move the sliding coupling housing from the first axial position to the second axial position.

15. The method of claim 13, wherein coupling the engine with the propulsor includes relighting the engine.

16. The method of claim 13, further comprising deenergizing the electric machine subsequent to coupling the engine with the propulsor.

17. An aircraft propulsion system comprising:

an engine;

an electric machine;

a gearbox including an output shaft, an electric machine drive gear, an engine drive gear, and a clutch assembly, the output shaft having a rotational axis, the electric machine drive gear mounted on the output shaft, the electric machine drive gear driven by the electric machine, the engine drive gear selectively couplable with the output shaft by the clutch assembly, the clutch assembly including a bearing disposed between the output shaft and the engine drive gear, the engine drive gear rotatable relative to the output shaft on the bearing, the clutch assembly selectively coupling the engine drive gear with the output shaft, the clutch assembly configurable in a disengaged state and an engaged state, the clutch assembly further including a first coupling assembly, a second coupling assembly, and a magnetic alignment system, the first coupling assembly including a first coupling body and a plurality of first axial springs, the first coupling body moveably mounted on the engine drive gear, the plurality of first axial springs biasing the first coupling body axially outward from the engine drive gear toward the second coupling assembly, the second coupling assembly including a sliding coupling housing, a second coupling body, and a plurality of second axial springs, the sliding coupling housing moveably mounted on the output shaft, the sliding coupling housing axially moveable between a first axial position and a second axial position, the second coupling body moveably mounted on the sliding coupling housing, the second coupling body disengaged from the first coupling body with the sliding coupling housing in the first axial position, the second coupling body engaged with the first coupling body with the sliding coupling housing in the second axial position, the plurality of second axial springs biasing the second coupling body axially outward from the sliding coupling housing toward the first coupling assembly, and a magnetic alignment system including a plurality of first magnet members and a plurality of second magnet members, the plurality of first magnet members mounted at the first coupling body as a first circumferential arrangement, the plurality of second magnet members mounted at the second coupling body as a second circumferential arrangement; and a propulsor driven by the output shaft.

18. The aircraft propulsion system of claim 17, wherein the first coupling body includes a first ring body segment and a plurality of first coupling body segments, the plurality of first coupling body segments are arranged on the first ring body segment as a first circumferential array, and the plurality of first coupling body segments project axially outward from the first ring body segment toward the second coupling body.

19. The aircraft propulsion system of claim 18, wherein one of the plurality of first magnet members is disposed on each of the plurality of first coupling body segments.

20. The aircraft propulsion system of claim 18, wherein one of the plurality of first magnet members is disposed on the ring body segment circumferentially between each circumferentially adjacent pair of the plurality of first coupling body segments.

* * * * *